Dec. 25, 1962
A. M. LEWIS
3,069,994
FOOD STEAMER
Filed July 29, 1959
5 Sheets-Sheet 1
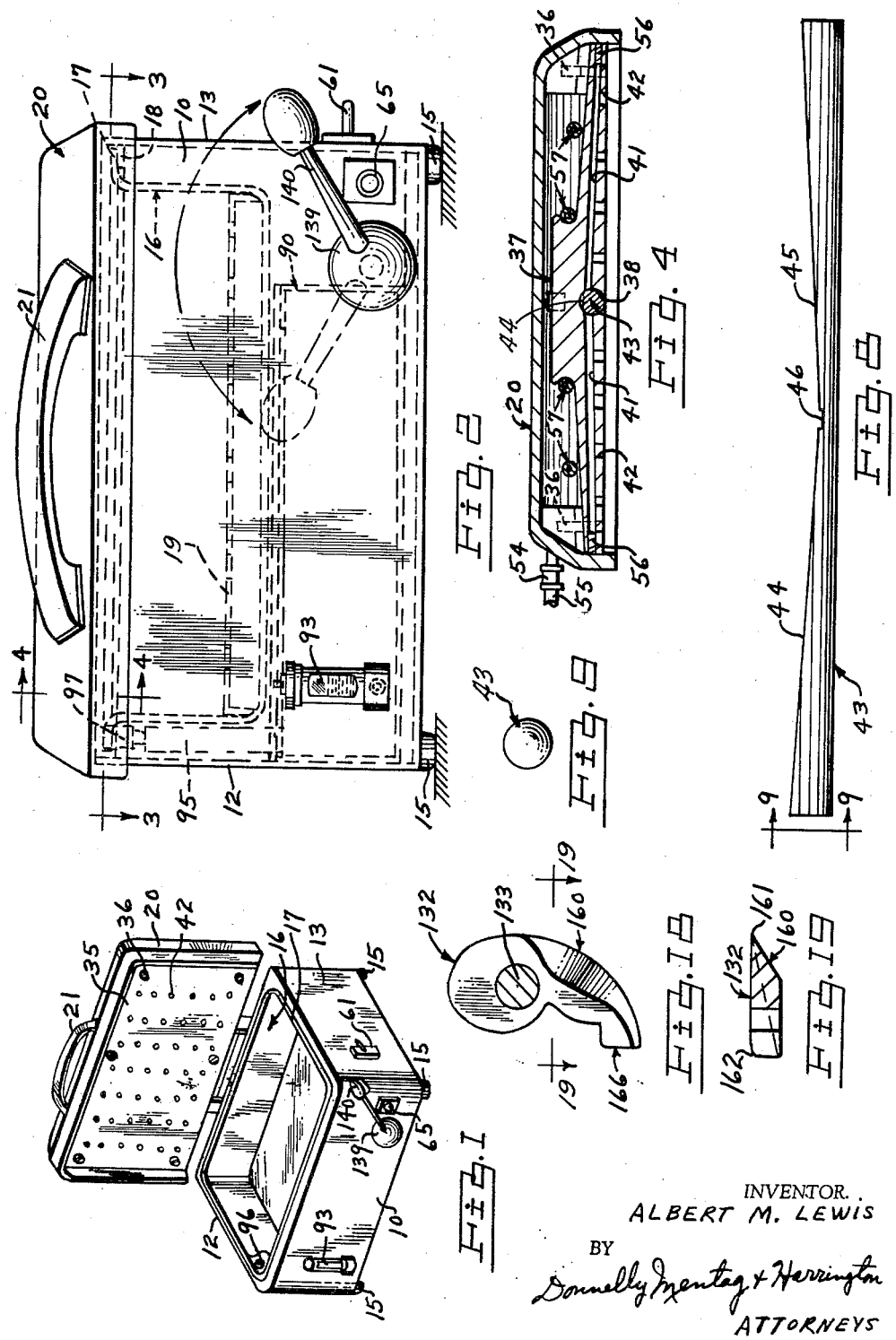
INVENTOR.
ALBERT M. LEWIS
BY
Donnelly Mentag & Harrington
ATTORNEYS Dec. 25, 1962

A. M. LEWIS 3,069,994

FOOD STEAMER

Filed July 29, 1959

INVENTOR.
ALBERT M. LEWIS
BY
Donnelly, Mentag & Harrington
ATTORNEYS

Dec. 25, 1962  A. M. LEWIS  3,069,994
FOOD STEAMER
Filed July 29, 1959  5 Sheets-Sheet 3
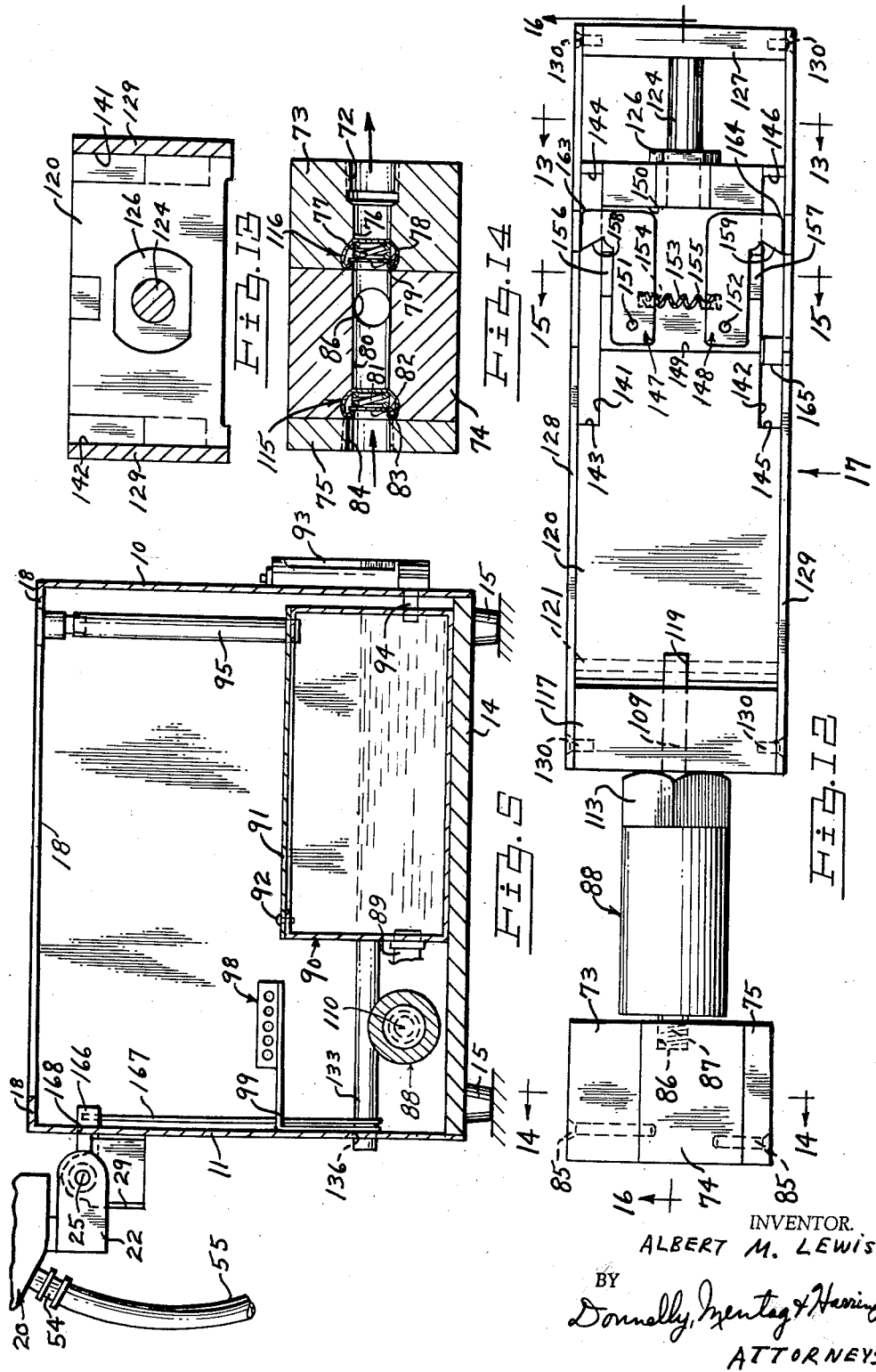
INVENTOR.
ALBERT M. LEWIS
BY Donnelly, Mentag & Harrington
ATTORNEYS

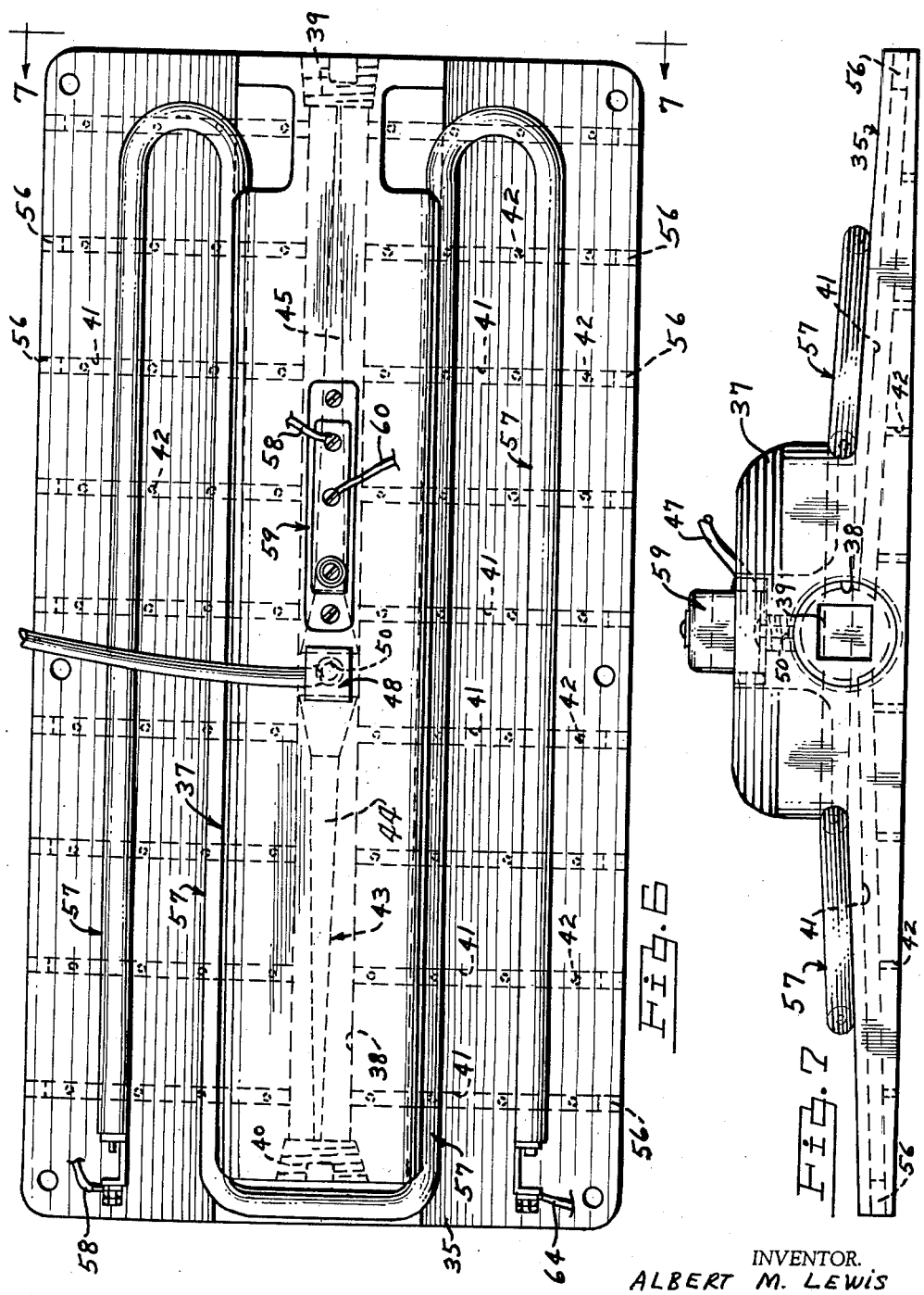

Dec. 25, 1962
A. M. LEWIS
3,069,994
FOOD STEAMER
Filed July 29, 1959
5 Sheets-Sheet 5
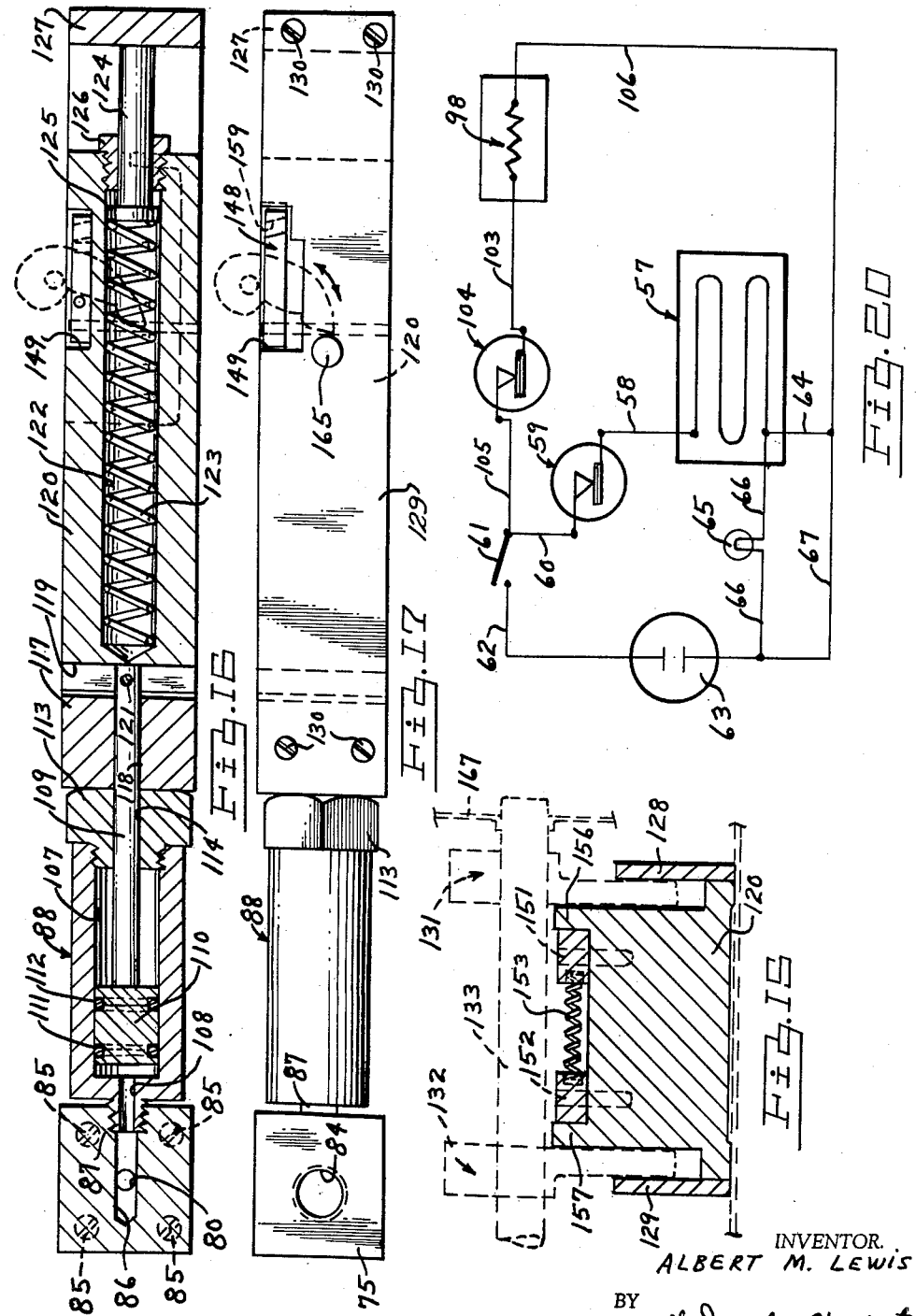
INVENTOR.
ALBERT M. LEWIS
BY
Donnelly, Mentag & Harrington
ATTORNEYS

United States Patent Office 3,069,994
Patented Dec. 25, 1962

3,069,994
FOOD STEAMER
Albert M. Lewis, 1504 Huntington Blvd.,
Grosse Pointe Woods, Mich.
Filed July 29, 1959, Ser. No. 830,383
3 Claims. (Cl. 99—234)

This invention relates to improvements in the flash steamer art, and, more particularly, to a novel and useful flash steamer adapted for use in warming foods, sterilizing medical instruments, and other like steaming operations.

It is an important object of the present invention to provide an instant food warmer which may be used for warming buns, sandwiches, vegetable, pre-cooked foods, baked goods, and other like food, for defrosting instantly frozen vegetables, meat and sea food, and, for instantly tenderizing fresh meat ready for the grill with a minimum of time, effort and cost.

It is another object of the present invention to provide a food warmer of this class which is simple and compact in structure, economical to manufacture, durable, highly efficient in use, attractive in appearance, and which may be easily and quickly operated.

It is still another object of the present invention to provide a food warmer of this class which includes a steam generating chamber disposed above a food chamber, whereby steam may be instantly generated and delivered into the food chamber to warm the food disposed therein, in a flash operation, and in such a manner that the steam will be in a dry state and will penerate the food without making the food moist and unpalatable.

It is a further object of the present invention to provide a food warmer of the class described which is provided with a movable cover having a steam generating chamber that coacts with a plurality of steam discharge passages for conveying the steam into a food compartment.

It is a still further object of the present invention to provide a food warmer having a steam generating chamber heated to a temperature, whereby, when water is injected therein it will be instantly turned into steam, and, wherein the food warmer is provided with a manually operated, spring powered pump for forcing a predetermined amount of water into the steam generating chamber.

Another object of the invention is the provision in a steamer apparatus of this class of a steam generating means including a plate having a steam generating chamber and a plurality of steam discharge passages connected thereto for delivering the steam to a lower disposed food compartment, and wherein an elongated close fitting metal dispersion rod is mounted in said steam generating chamber.

Other objects, features and advantages of this invention will be apparent from the following detailed description and appended claims, reference being had to the accompanying drawing forming a part of the specification wherein like reference numerals designate corresponding parts of the several views.

In the drawings:

FIG. 1 is a perspective view of a food warmer embodying the principles of the invention, showing the cover in an open position;

FIG. 2 is a front elevational view of the structure illustrated in FIG. 1;

FIG. 3 is a horizontal view of the structure illustrated in FIG. 2, taken along the line 3—3 thereof, with the cover removed, and looking in the direction of the arrows;

FIG. 4 is a transverse elevational sectional view of the cover of the food warmer taken along the line 4—4 of FIG. 2, and looking in the direction of the arrows;

FIG. 5 is an elevational sectional view of the structure illustrated in FIG. 3 taken along the line 5—5 thereof and looking in the direction of the arrows;

FIG. 6 is a top plan view of the steam generating chamber and plate which is carried in the cover of the steamer;

FIG. 7 is an end elevational view of the structure illustrated in FIG. 6 taken along the line 7—7 thereof and looking in the direction of the arrows;

FIG. 8 is a side elevational view of a steam dispersing bar which is mounted in the steam generating chamber of the invention;

FIG. 9 is an end elevational view of the structure illustrated in FIG. 8 taken along the line 9—9 thereof and looking in the direction of the arrows;

FIG. 10 is a side elevational view of a water inlet fitting for the steam generating means;

FIG. 11 is a top plan view of the structure illustrated in FIG. 10;

FIG. 12 is a top plan view of the water pump employed in the invention;

FIG. 13 is an elevational sectional view of the structure ilustrated in FIG. 12 taken along the line 13—13 thereof and looking in the direction of the arrows;

FIG. 14 is an elevational sectional view of the structure illustrated in FIG. 12 taken along the line 14—14 thereof and looking in the direction of the arrows;

FIG. 15 is an elevational sectional view of the structure illustrated in FIG. 12 taken along the line 15—15 thereof looking in the direction of the arrows and showing the cam operating means;

FIG. 16 is a longitudinal elevational sectional view of the structure illustrated in FIG. 12 taken along the line 16—16 thereof and looking in the direction of the arrows;

FIG. 17 is a side elevational view of the structure illustrated in FIG. 12 taken in the direction of the arrow 17;

FIG. 18 is a side elevational view of an actuating cam employed in the invention;

FIG. 19 is a horizontal sectional view of the structure illustrated in FIG. 18 taken along the line 19—19 thereof and looking in the direction of the arrows; and, FIG. 20 is a diagrammatic view of the electrical wiring used in the invention.

Referring now to the drawings, in particular to FIGS. 1–5, an illustrative embodiment is shown therein which comprises a cabinet or housing having a front wall 10, a rear wall 11, a left side wall 12 and a right side wall 13. The cabinet walls 10–13 are preferably made from a stainless steel material and are fixedly secured by any suitable means to the base plate 14. The cabinet is provided with the supporting rubber pads 15 which are suitably fixedly secured to the base plate 14. A food container in the form of a removable pan is generally indicated by the numeral 16, is adapted to be removably seated in the upper end of the cabinet. As shown in FIGS. 1 and 2, the food container 16 is provided with a peripheral flange as 17 on the upper end thereof which is adapted to be seated on the flanges 18 which extend inwardly from the upper end of each of the cabinet walls. As indicated in FIG. 2, a perforated removable food tray may be disposed in the food container for supporting the food above the bottom wall of the food container.

As shown in FIGS. 1–5, the food warmer of the present invention is provided with a hingedly mounted cover generally indicated by the numeral 20 which is adapted to enclose the upper end of the cabinet. The cover 20 is hollow and is open on the lower side thereof and is provided with a suitable handle as indicated by the numeral 21. The cover is hingedly supported on the rear side of the cabinet by means of the following described structure. Fixedly mounted on the rear side of the cover are the hinge arms 22, 23 and 24 which are carried on the horizontal hinged shaft 25. The shaft 25 is supported on the arms 26 and 27 which are integral with and extend outwardly from the plate 28 which is fixedly secured on the rear wall 11 of the cabinet by any suitable means. The arms 26 and 27 are provided with the outwardly extended flanges 29 and 30 respectively, and these flanges act as stop abutments for the cover hinge members 22 and 24. The cover is provided with a pair of return springs 31 and 32 which are disposed on the shaft 25 and which have one of the ends thereof fixedly connected to the central cover hinge member 23 and the other ends thereof fixedly connected to the members 33 and 34 which are fixed to the cabinet rear wall 11.

As shown in FIGS. 1, 4, 6 and 7, the cover 20 is adapted to carry the steam generating and delivery means which is disposed over the food compartment or container when the cover is in the closed position. The steam generating means includes the plate 35 which is adapted to be fixedly secured in the cover 20 by any suitable means, as by the screws 36. The outer face of the plate 35 is flat and this plate is provided with the longitudinally extended raised portion 37 on the upper side thereof. The plate 35 is preferably formed from extruded aluminum. As best seen in FIGS. 6 and 7, a longitudinally extended steam generating chamber 38 is formed in the raised portion 37 and is adapted to be enclosed at the rear end thereof by the threaded plugs 39 and 40. The chamber 38 communicates with a plurality of transversely disposed steam delivery passages 41, each of which is provided with a plurality of downwardly directed discharge ports 42 for delivering the steam into the food container in an evenly distributed manner. As shown in FIGS. 6 and 8, an elongated bar generally indicated by the numeral 43 is disposed in the chamber 38 and extends from end to end thereof. The bar 43 is generally circular in cross section as shown in FIG. 9, but is provided on the upper side thereof with the pair of flat surfaces indicated by the numerals 44 and 45 which taper inwardly from the ends of the bar to the centrally disposed recess 46. The bar 43 is preferably made to a size corresponding to the diameter of the chamber 38 whereby there is a clearance of approximately $\frac{1}{64}$ of an inch on each side of the bar. Water is delivered into the steam generating chamber 38 through the tube 47 which is connected in the fitting 48. The tube 47 receives the water from a tank disposed in the bottom of the cabinet as more fully explained hereinafter.

The tube 47 is suitably connected in the port 49 of the fitting 48 and this fitting is threadably mounted in the inlet hole 50 in the plate raised portion 37. The inlet fitting 48 (see FIG. 10) is provided with the tubular extension 51 which is closed at the lower end thereof and which is provided with the exit holes 52 which are adapted to be disposed longitudinally of the chamber 38 whereby water entering the steam generating chamber will be directed longitudinally of the chamber and on to the tapered flat portions 44 and 45 of the bar 43. The bore in the fitting 48 is closed at the upper end thereof by means of a suitable plug as indicated by 53. As shown in FIG. 4, the tubing 47 is adapted to extend out the back of the cover 20 and is connected to a suitable fitting as 54. The tubing 47 is preferably formed from a suitable metal tubing as copper. Connected to the fitting 54 is a flexible water tubing 55 which is connected to the water storage tank as more fully explained hereinafter. As shown in FIGS. 6 and 7, the outer ends of the transverse steam passages 41 are closed off by means of suitable plugs as 56.

The plate 35 is heated by means of a suitable heating coil generally indicated by the numeral 57 for maintaining the temperature of the plate 35 at a predetermined temperature so that when the water is delivered into the compartment 38, it will be instantly turned into steam. Experience has shown that a temperature of 330° or higher is desirable. It is preferable that the temperature be such that the steam will be immediately preheated. The electrical heating coil 57 is disposed so as to curve and extend longitudinally of the plate 35 over several courses so as to evenly distribute the heat in the plate 35. The electrical heating element may be connected to any suitable source of electrical energy. As shown in FIG. 20, the heating element 57 is connected by the lead 58 to a suitable thermostat 59 for regulating the temperature of the plate 35. The thermostat is connected by means of the lead 60 to the on-off switch 61, which is mounted on the right side of the cabinet on the wall 13, as shown in FIGS. 1 and 2. The switch 61 is operatively connected by means of the lead wire 62 to the power inlet plug 63 which is preferably mounted on the back of the cabinet inside of a suitable box as indicated by the numeral 68 and shown in FIG. 3. The other end of the heating element 57 is connected by means of the leads 64 and 67 to the inlet plug 63. The signal light 65 is connected in parallel with the heater element 57 by means of the leads 66 whereby when the signal light is on, the operator will be informed that the current is flowing through the heating element. When the thermostat 59 breaks the circuit through the heating element 57, the signal light 65 will be extinguished.

As shown in FIG. 3, the flexible water feed tube 55 is connected at the lower end thereof to a suitable fitting 69 which is connected to the pipe 70 which in turn extends through the rear cabinet wall 11. The pipe 70 is connected to a suitable fitting 71 which is in turn adapted to be operatively connected to the outlet port 72 in the block 73, as shown in FIG. 14. The blocks 73, 74 and 75 are adapted to form the inlet and outlet valve structure of a pump means for pumping water through the flexible tube 55 and up to the steam generating means. As shown in FIG. 14, the outlet port 72 communicates with the passage 76 which is enlarged at the inner end thereof for the reception of an outlet check valve. The outlet check valve comprises the coil spring 77 which is adapted to normally urge the valve diaphragm 78 into a closing engagement with the valve seat 79. The aforedescribed outlet check valve communicates the passage 76 with the transverse passage 80 in the inner block 74. The passage 80 is enlarged at the entrance end thereof so as to seat an inlet check valve comprising the coil spring 81 which is adapted to normally bias the valve diaphragm 82 into a seating engagement against the valve seat 83. The last mentioned check valve structure communicates the passage 80 with the entrance port 84 which is formed in the block 75. The blocks 73, 74 and 75 are made from any suitable material as aluminum or the like. As shown in FIGS. 12 and 16, these blocks are made to be fixedly secured together with any suitable means as by the screws 85.

The transverse passage or bore 80 in the middle block 74 communicates with the longitudinal passage or bore 86 which opens at one side of this block and which is adapted to threadably receive the reduced neck portion 87 of a tubular member or cylinder 88. As shown in FIGS. 3 and 5, the inlet port 84 is adapted to receive one end of the pipe 89, the other end of which is operatively connected to a water storage tank 90 which is disposed in the bottom of the cabinet to the left side thereof as viewed from the front of the cabinet. The tank 90 is provided with a removable top 91 which is secured in place by a plurality of screws as 92. The water storage tank 90 is provided with a visible water gauge 93 which is mounted on the front of the cabinet and connected to the tank by means of the pipe 94 as shown in FIG. 5. The tank 90 is provided with a fill pipe 95 which extends upwardly from the front left corner of the tank and which is aligned with a hole 96 formed through the flange 17 of the food compartment pan. A suitable plug 97, as shown in FIG. 2, may be employed to close the upper end of the fill pipe 95.

The food warmer is provided with a suitable heater generally indicated by the numeral 98 as shown in FIGS. 3 and 5 for maintaining a predetermined temperature in the food pan by means of direct contact therewith. The heating element 98 extends longitudinally of the cabinet and is disposed towards the rear side thereof and engages the lower side of the food pan or compartment. The heating element 98 is supported by means of the brackets 99 and 100 which are fixedly connected by any suitable means as by welding to the cabinet rear wall 11. The heating element 98 may be fixedly connected to the brackets 99 and 100 by any suitable means as by the screws 101 and 102. As shown in FIG. 20 the heating element 98 is connected to one terminal of the power inlet plug 63 by means of the leads 103, 105 and 62 and the thermostat 104 and switch 61. The other end of the heating element 98 is connected to the other terminal of the plug 63 by means of the leads 106 and 67.

As best seen in FIGS. 3 and 16, the cylinder 88 is tubular and hollow to provide an internal compartment, as indicated by the numeral 107. The internal compartment 107 of the cylinder is connected by means of the passage 108 to the passage 86 in the previously described valve block structure. Slidably mounted in the compartment or bore 107 is a piston 110 which is provided with a pair of suitable sealing rings indicated by the numerals 111 and 112. Fixedly connected to the piston 110 is a piston rod 109 which extends out of the open end of the cylinder 88 as shown in FIG. 16. The open end of the cylinder 88 is enclosed by means of the threadably mounted cap 113 which is provided with the central hole 114 for the passage therethrough of the rod 109. It will be understood that the piston 110 is operative to draw a predetermined amount of water from the tank 90 when the piston is moved to the right, as viewed in FIG. 16, and to force this amount of water outwardly and into the flexible tube 55, and up into the steam generating chamber when the piston is moved to the left as viewed in FIG. 16. It will be seen from the inspection of the check valves as shown in FIG. 14, that the check valve generally indicated by the numeral 115 will open when the piston 110 creates a suction thereon by means of the piston moving to the right as viewed in FIG. 16. This suction action will also maintain the outlet check valve 116 in the closed position against the seat 79. When the piston is moved to the left for a power stroke, a pressure will be created thereby on the water drawn from the storage tank, and the check valve action will be reversed, that is, the check valve 115 will be forced against its seat 83 and the check valve 116 will be opened to permit the water to be forced up into the steam generating chamber.

The piston 110 is adapted to be manually moved to the right as viewed in FIG. 16, and then spring actuated to the left by means of the following described structure. A piston rod 109 extends through the hole 118 in the stationary block 117 and into the vertical recess 119 formed in the front end of the slide block or member 120. The piston rod 109 is fixedly connected to the slide member 120 by means of the cross pin 121. As best seen in FIGS. 3 and 16, the slide member 120 is provided with a longitudinally extended centrally disposed bore 122.

As shown in FIGS. 3, 12 and 16, the bore 122 opens out of the rear end of the sliding member 120 and mounted in this bore is the coil spring 123. The inner end of the spring 123 abuts the inner end of the bore 122 and the outer end of the spring abuts the enlarged head 125 on the rod 124. The rod 124 is an adjusting rod for adjusting the pressure on the spring 123. It will be seen that by moving the rod 124 inwardly and outwardly of the bore 122 that the tension on the spring 123 may be adjusted. The rod 124 is held in an adjusted position by means of the lock nut 126 which is threadably mounted in the open end of the bore 122. A secondary stationary block 127 is disposed in alignment with the sliding block 120. A pair of side plates 128 and 129 are fixedly connected between the stationary blocks 117 and 127 by means of the screws 130. It will be seen that the elongated plates 128 and 129 form a guide or track for the sliding member 120.

As shown in FIG. 3, the manual means for moving the sliding member 120 against the compression pressure of spring 123 includes the two cams 131 and 132 which are fixedly mounted on the shaft 133 by means of the said screws 134 and 135, respectively. The rear end of the horizontal shaft 133 is rotatably mounted in a suitable hole as 136 in the cabinet rear wall 11 and the front end of the shaft 133 is also suitably rotatably mounted in a hole as 138 in the cabinet front wall 10. A knob as 139 is fixedly connected by a suitable means to the front end of the shaft 133 on the outside of the cabinet front wall 10 and an operating lever 140 is fixedly connected to the knob 139 as shown in FIGS. 1 and 3.

As shown in FIGS. 3 and 15, the shaft 133 is disposed above the sliding block 120 and the cams 131 and 132 extend downwardly therefrom and into the vertical slots 141 and 142 which are cut out of the sides of the block 120. The slot 141 extends between the points indicated by the numerals 143 and 144 and the slot 142 extends between the points indicated by the numerals 145 and 146.

As shown in FIGS. 3 and 12, a pair of swingably mounted cam latches 147 and 148 are mounted in a transverse slot as formed in the right end of the upper surface of the slide member 120 as viewed in FIG. 12 and this slot extends between the points marked by the numerals 149 and 150. The latches 147 and 148 are swingably mounted on the vertical pins 151 and 152 which are fixed in the sliding member 120. The latches 147 and 148 are normally biased outwardly about their respective pivot pins by means of the coil spring 153 which is mounted in the holes 154 and 155 in the inner side faces of these latches respectively. The spring 153 normally biases or urges the latches 147 and 148 outwardly into engagement with the abutments or stop members 156 and 157 which are integrally formed with the sliding member 120. As shown in FIG. 12, the latches 147 and 148 are substantially L-shaped with the longer leg thereof being connected to the pivot pins and the shorter leg extended outwardly. Each of the short outwardly extended legs of the latches are provided on the inner faces thereof with a V-shaped slot as 158 and 159 which form a pocket for the reception of the cams 131 and 132.

As shown in FIGS. 16 and 18, each of the cams 131 and 132 is provided with a curved camming face 160 which curves downwardly and to the left as viewed in FIG. 16. The curved cam faces 160 are provided with a sharp or pointed edge 161 as shown in FIG. 19. The curved cam edges 160 are adapted to be normally disposed in the V-shaped recesses 158 and 159 in the outwardly extended latch arms whereby when the operating handle 140 is moved counter-clockwise, as viewed in FIG. 2, the curved cam faces 160 will engage the latches 147 and 148 for moving the slide member 120 to the right as viewed in FIG. 3. Continued movement of the lever 140 will force the latches 147 and 148 to the right, and the sliding block 120 will be moved to the right as viewed in FIG. 16, and against the compression force of the spring 123. When the operating lever 140 reaches the dotted position shown in FIG. 2, the lower edge of the cam face 160 will ride up and out of the slots 158 and 159 in the cam latches and the spring 123 will operate to force the sliding block 120 and the rod 109 and the piston 110 to the left as viewed in FIG. 16 for a pumping stroke. The operator then manually moves the lever 140 back to the solid line position shown in FIG. 2, and the curved corner 162 on each of the cams will engage the rounded corners 163 and 164 on the cam latches, and cam the latches inwardly against the pressure of the spring 153 whereby the cams may be moved back to the ready position shown in FIG.

3. The clockwise movement of the cams back to the ready position is limited by the stop pin 165 which is engaged by the lower vertical face 166 and the lower end of the cam 132. The aforementioned movement of the sliding block 120 operates the piston 110 to force a slug or charge of water of a predetermined amount upwardly into the steam generating chamber for a food warming operation. The food warmer may not be operated, however, if the cover 20 is in the open position because of the safety interlocking members 166 and 167.

As shown in FIGS. 3 and 5, the hinge member 24 is provided with an extension 166 which is adapted to extend into the cabinet through the hole 168 and the cabinet back wall 11 when the cover is in the open position. An elongated plate or rod 167 is fixedly connected at the lower end thereof to the cam shaft 133 and the upper end thereof is adapted to abut against the extension member 166 when the cover 20 is open and the operating lever 140 is in the solid line position shown in FIG. 2. Accordingly, it will be seen that the lever 140 may not be operated when the cover 20 is open since the rod 167 will engage the member 166 and will be prevented from moving counter-clockwise as viewed in FIG. 2.

In the use of the food warmer of the present invention, the operator would fill the water tank 90 with water and connect the inlet plug 63 to a suitable source of electrical power. The food to be warmed is then placed in a container 16 and the switch 61 is moved to the "on" position. The apparatus is then allowed a few minutes to heat up. After the initial warm-up period, the food warmer is ready for use. The operating lever 140 is then moved to the dotted position shown in FIG. 2, and such action draws a predetermined amount of water from the tank 90 through the valve 115 and into the cylinder 88 from whence it is pumped through the outlet valve 116 and into the steam chamber in the cover. When the water is pumped into the steam chamber 38 and into the plate 35, super-heated steam is formed in a flash and exits through the plurality of holes 42 and into warming engagement with the food in the container 16.

Experience has shown that the instant food warmer is efficient in operation, easy to use and may be used to warm many different types of food.

The disposition of the steam generating means over the food container prevents the accumulation of sediment in the steam inlet apertures or delivery holes. Sediment is usually formed in the lower or food container from the steam and food crumbs over a period of time, but in the present invention it will have no injurious effect on the operation of the food warmer. The temperature of the steam chamber is preferably maintained approximately at 350 degrees F. The food compartment temperature is preferably held in the range of from 220 degrees to 250 degrees F. The pump charge for each operation is approximately 13½ cubic centimeters.

While it will be apparent that the preferred embodiment of the invention hereindisclosed is well calculated to fulfill the objects above stated, it will be appreciated that the invention is susceptible to modification, variation and change without departing from the proper scope or fair meaning of the subjoined claims.

What I claim is:

1. In a device of the class described, a cabinet having a container for the reception of articles; a cover swingably mounted on said cabinet for covering said container; a steam generating chamber in said cover; means in said cover for receiving steam generated in said chamber and delivering it into said container; heating means in said cover for heating said steam generating chamber; a water storage tank mounted in said cabinet below said container; a manually operable pump mounted in said cabinet below said container and connected between said tank and said steam generating chamber for pumping water from said tank to said chamber, said pump including means for manual actuation of the pump through a suction action to draw a quantity of water from the tank, and spring means for actuating the pump through a discharge action after said suction action to pump the quantity of water to said chamber; interlocking means between said cover and said pump for locking the pump in an inoperative position when the cover is in the open position; a dispersion bar in said chamber; said means for receiving steam and delivering it into said container including a rectangular plate having a flat outer face disposed over said container, a longitudinally extended raised portion on the upper side of said plate, said chamber being formed in said raised portion, a plurality of transversely disposed, longitudinally spaced apart steam delivery passages formed in said plate and communicating with said chamber, each of said steam delivery passages being provided with a plurality of downwardly directed discharge ports for delivering steam to said container; said chamber being cylindrical in shape; said dispersion bar being cylindrical in shape and disposed in said chamber, and being provided with a flat surface on the upper side of each end thereof; and, said pump connected to said chamber to deliver water into the upper side thereof.

2. The structure as defined in claim 1, wherein: said pump includes a piston and an actuating rod, a slide block connected to said rod, a pair of latches swingably mounted on said slide block, said means for manual actuation of the pump including a rotatable horizontal cam rod mounted in said cabinet below said container and having an outer end extending out of the front side of the cabinet, and provided with an operating handle on said outer end and a pair of cams operatively engageable with said latches when said handle is rotated in one direction to move said slide block and piston in one direction to draw a quantity of water from the tank and disengageable from said latches after a predetermined movement of said handle, said spring means engaging said slide block and operable for moving said slide block and piston in the opposite direction to pump said quantity of water to said chamber.

3. The structure defined in claim 2, wherein: said cover is swingably mounted on said cabinet by means of a hinge construction having one part thereof attached to said cover, and said interlocking means including an extension member fixed on said one hinge part and extended into said cabinet, and a rod fixed to the inner end of said cam rod and engageable with said extension member when said cover is moved to the open position to prevent rotation of said cam rod.

References Cited in the file of this patent

UNITED STATES PATENTS

| 2,181,434 | Lewis et al. | Nov. 28, 1939 |
| 2,334,222 | Schoell | Nov. 16, 1943 |
| 2,344,705 | Lucia | Mar. 14, 1944 |
| 2,674,935 | Lewis et al. | Apr. 13, 1954 |
| 2,786,932 | Lewis | Mar. 26, 1957 |
| 2,973,705 | Klemm | Mar. 7, 1961 |